Dec. 29, 1931.   J. SCHULMAN   1,838,114
COMBINATION SHELL FOR MOTOR VEHICLE FRONTS
Filed April 16, 1931
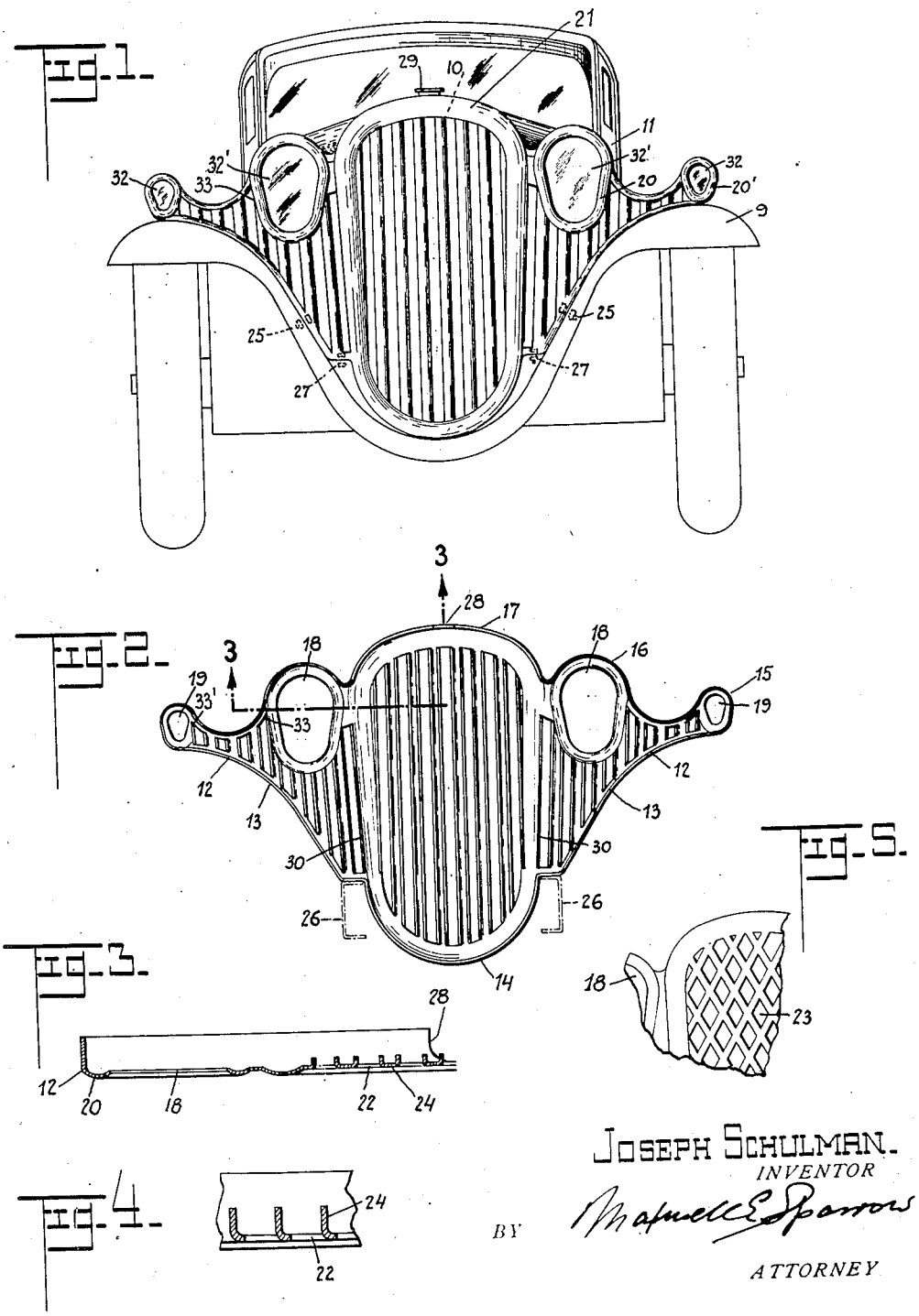
Joseph Schulman.
INVENTOR
BY Maxwell E. Sparrow
ATTORNEY Patented Dec. 29, 1931

1,838,114

UNITED STATES PATENT OFFICE

JOSEPH SCHULMAN, OF NEW YORK, N. Y.

COMBINATION SHELL FOR MOTOR VEHICLE FRONTS

Application filed April 16, 1931. Serial No. 530,595.

This invention relates generally to a shell or integral unit to be used in conjunction with or as part of a motor vehicle with relation to its front portion.

The front of a motor vehicle, at present, represents a conglomeration of parts, including wagging, vibrating fenders with bars connecting them; big posts carrying headlights, little posts carrying parking lights, other posts carrying mirrors, each element bearing no relation to any other element with respect to design, scheme or function, and the elements taken collectively lacking in character and coherence.

It is, therefore, an aim of this invention to overcome the above disadvantages by providing an integral unit adapted to be attached to the front portion of a motor vehicle, which is capable, as a unit, of providing a spacer or tie for the fenders, fronts and supports for the head and parking lights and a shell or guard for the radiator.

A further object of the invention is in the provision of a rigid unitary front construction, for a motor vehicle, adapted to be secured to the chassis, having in integral combination or association a cover and protector for the radiator, a spacer for the fenders, apertured front covers and supports for the head and parking lights, and which is adapted for attachment thereto, of rear view reflector means.

A further object of the invention is in the provision of a firm unitary front structure for a motor vehicle characterized by its utilization as a spacer for spanning the fenders, and a substitute for the presently used radiator shell.

A further object of the invention is in the provision of a rigid unitary front shell for a motor vehicle which is adapted to be used on a vehicle equipped with radiator front and covers for the lights, in which event the shell functions as a guard or shield for the radiator, head lights and parking lights, as well as a rigid spacer to prevent the fenders from rattling; the said shell being also adapted to be used in lieu of the customary radiator shell, outer casings or covers for the lights and tie bar which spaces the fenders.

A further object of the invention is to provide as an article of manufacture a shell adapted to span the space between the front fenders of a motor vehicle having a radiator, the shell being adapted for arrangement in front of the radiator to provide a cover or shield therefor, and for engagement with the fenders by which the latter may be made firm, the shell being provided with apertures and means by which illuminating fixtures may be supported at the inner side thereof adjacent the openings.

A further object of the invention is to provide a structure for a motor vehicle which can be used either as a shell or a shield for its radiator or which can function as both a shell and shield therefor.

A further object of the invention is to provide a simple, efficient, economical and rigid metallic structure, preferably in the form of a shell, for the front part of a motor vehicle.

These and other objects of the invention and the means for their attainment will be more apparent from the following detailed description, taken in connection with the accompanying drawings, illustrating one embodiment by which the invention may be realized, and in which:

Fig. 1 is a front view of a motor vehicle having one form of the invention applied thereto.

Fig. 2 is a rear view of the said form of the invention.

Fig. 3 is a detailed cross-sectional view taken along the lines 3—3 of Fig. 2.

Fig. 4 is a cross sectional view of part of the shell in a modified form.

Fig. 5 is a portion of a modified form of the invention.

In the drawings the invention is shown as a rigid unitary shell structure applied to the front of a motor vehicle 11, which is preferably stamped from a single piece of suitable metallic material, and the stamped piece is then bent, formed and shaped to conform with the desired requirements. By this process the blank has been metamorphized into a shell having a peripheral flange 12, the side portions thereof conforming in contour with the shape of the fenders 9 and the lower portion thereof fitting under the radiator 10 as shown at 13 and 14, respectively, and the upper portion thereof forming a contour for the parking and head lights 32—32', respectively, and radiator 10, as shown at 15, 16 and 17, respectively. The structure spans the fenders when in operative position.

The shell is provided with the large openings 18 for the head lights and smaller openings 19 for the parking lights, the openings being surrounded by the beads 20, 20', respectively, formed by bulging the blank at those points. The bead 21 encompassing the portion of the shell in front of the radiator is likewise formed.

The portions of the shell which extend over the radiator 10 and adjacent and below the head light openings 18 are provided with a plurality of apertures which may be in the form of vertical slots 22 as seen in Figs. 1, 2 and 3, or diamond shaped 23 as seen in Fig. 5, or may be in other suitable shapes, the said apertures being produced by slitting the blank and bending the slitted portions 24 rearwardly at preferably a right angle with respect to the main portion of the shell.

Fig. 3, shows the material between the slots 22 U-shaped, whereas Fig. 4, shows the material between the slots substantially L-shaped. Suitable shutters (not shown) operable within the slots adjacent the radiator may be provided.

When the device is fitted onto the front of the motor vehicle, the portions 13 of the shell flange abut against the fenders 9, the shell thereby functioning as a spacer for the fenders and by securing the fenders to the flange of the shell by suitable means 25, the fenders are prevented from rattling or wiggling. This arrangement does away with the cross bars connecting the fenders. The shell is secured to the chassis 26 by bolts 27.

When the shell is in this operative position the upper portion of the flange seats over the radiator, or brackets (not shown) provided thereon, the flange being provided with a slot or cut-out 28 to enable it to fit around the radiator cap 29, the material bent to form the slots adjacent the sides of the radiator providing side flanges 30 which abut against the sides of the radiator. The material bent to form the slots adjacent the openings 18, 19, provide flanges 33, 33', for supporting or encasing the head and parking lights, the portions of the device at these points providing covers for the head and parking lights. The shell flange 12 fits over the bodies (not shown) of the head and parking lights, 32', 32, the shell at these points functioning as the fronts or outer covers or casings for the lights and as supports for the latter, thereby eliminating the customary posts used for carrying these lights.

The device may be used on motor vehicles which are equipped with the tie bars, light supporting posts and radiator shell, in which event the device functions as a guard or shield for the radiator, head and parking lights, and as a spacer to which the fenders are attached to prevent the latter from wagging or rattling. The shell conceals the radiator which is usually rough and irregular in shape.

Instead of being made of a single piece of material my device may be built up of a plurality of sections joined together in any suitable manner to provide an integral, unitary structure. It is understood that the general contour of my device may be changed to conform to any of the existing designs of motor vehicle fronts, and is capable of endless ornamentation without additional cost.

It will thus be seen that there is herein-described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent, is:

1. As an article of manufacture for use in conjunction with a motor vehicle having front fenders and radiator, a combined radiator shell and spacer for spanning the fenders and adapted for engagement with the fenders.

2. As an article of manufacture a combined radiator shell and front light carrier for motor vehicles.

3. As an article of manufacture for motor vehicles, a combined radiator shell, front light carrier and spacer for spanning the front fenders thereof.

4. As an article of manufacture a combined radiator cover and front light carrier for a motor vehicle having front fenders, adapted for engagement with the fenders and by which the latter may be made rigid.

5. As an article of manufacture a shell adapted to span the space between the front fenders of a motor vehicle having a radiator, the said shell being adapted for arrangement in front of the radiator to provide a cover therefor and for engagement with the fenders by which the latter may be made firm, the said shell being provided with apertures and means by which illuminating fixtures may be supported at the inner side thereof adjacent the apertures.

6. A unitary front structure for a motor vehicle equipped with front fenders and radiator, comprising in integral association a shell for the radiator, and a spacer spanning the fenders, said structure having a peripheral flange for engagement with the fenders and radiator.

7. A unitary front structure for a motor vehicle equipped with front fenders and radiator comprising in integral association a front cover for the radiator and a spacer for the fenders, said structure being adapted for engagement with the fenders.

8. A unitary front structure for a motor vehicle equipped with front fenders and radiator comprising in integral association a front cover for the radiator, a spacer for the fenders, said structure having apertures, and means by which lights may be supported adjacent the apertures.

9. A unitary front structure for a motor vehicle equipped with front fenders and radiator comprising in integral association a front for the radiator, a spacer for the fenders, and perforated covers for supporting lights.

10. A unitary front structure for a motor vehicle equipped with front fenders and radiator comprising in integral association a front cover for the radiator, and a spacer for the fenders, said structure having openings, means by which lights may be supported adjacent the openings, and apertures, said apertures being formed by slitting the structure material and bending the slitted portions rearwardly.

11. A unit adapted for attachment in vertical position to the front portion of a motor vehicle having head and parking lights, radiator and front fenders, comprising a single sheet of material comprising a shell for the radiator, a spacer for the fenders and casings for the head and parking lights, said unit being adapted to support the lights.

12. A rigid unitary front structure for a motor vehicle adapted to be secured to the chassis thereof, the vehicle being equipped with front fenders, front lights and radiator, forming in integral association a shell for the radiator, a spacer spanning the fenders, and outer casings for the lights, said structure being adapted to support the lights.

13. A rigid unitary front structure for a motor vehicle adapted to be secured to the chassis thereof, the vehicle being equipped with front fenders, and radiator, forming in integral association a shell for the radiator, a spacer spanning the fenders, and said structure having openings and means by which lights may be supported adjacent the openings, and having a peripheral flange for engagement with the fenders and the radiator.

14. A unitary front structure for a motor vehicle adapted to be secured to the chassis thereof, the vehicle being equipped with front fenders, front lights and radiator, forming in integral association a shell for the radiator, a spacer spanning the fenders, and outer perforated covers for the lights, said structure being adapted to support the lights, and having a peripheral flange for engagement with the fenders and the radiator, said structure conforming in contour with the outline of the fenders at the engaged points.

15. A unitary front structure for a motor vehicle adapted to be secured to the chassis thereof, the vehicle being equipped with front fenders, front lights and radiator, forming in integral association a shell for the radiator, and casings to support the lights, said structure being adapted to span the fenders and for engagement therewith and having apertures formed by slitting portions of the structure material and bending the slitted portions rearwardly.

Signed at New York, in the county and State of New York, this first day of April, 1931.

JOSEPH SCHULMAN.